March 9, 1954

J. BOSCH 2,671,543

FLUID TRANSMISSION SYSTEM

Filed May 29, 1950

GOVERNOR SWITCH.
ON GEAR BOX.

INVENTOR.
JACK BOSCH
BY Mock & Blum
ATTORNEYS

March 9, 1954 — J. BOSCH — 2,671,543
FLUID TRANSMISSION SYSTEM
Filed May 29, 1950 — 2 Sheets-Sheet 2

INVENTOR.
JACK BOSCH
BY Mock & Blum
ATTORNEYS.

UNITED STATES PATENT OFFICE 2,671,543

FLUID TRANSMISSION SYSTEM

Jack Bosch, Smithtown, N. Y.

Application May 29, 1950, Serial No. 164,914

10 Claims. (Cl. 192—3.2)

My invention relates to an improved fluid transmission system for motor vehicles.

I provide a transmission system in which the drive from the engine crankshaft of the vehicle is transmitted to a driven shaft through a fluid coupling which engages with the driven shaft only after the rotation of the engine crankshaft has reached a specific speed, which is greater than idling speed. The transmission also includes means for directly coupling the driven shaft and the driving shaft.

One of the objects of the invention is to provide a transmission system of the type described which enables the vehicle to remain absolutely stationary, without creeping, while the engine is idling.

Another object of the invention is the provision of a transmission system of the type described which effectively utilizes the braking action of the engine at normal speeds, and at the will of the operator.

Still another object of the invention is the provision of a transmission system of the type described in which an intermediate or second gear is unnecessary and may be omitted from the gear train.

A further object of the invention is the provision of a transmission system of the type described which provides the benefits of either fluid drive or direct drive at those times in which they are most advantageous.

A further object of the invention is the provision of a transmission system of the type described in which automatic free wheeling is provided whenever necessary, except at those times in which free wheeling would be dangerous.

A still further object of the invention is the provision of a transmission system of the type described which is made of a relatively few simple parts, and is economical to manufacture.

Other objects and advantages of the invention will be apparent in the course of the following specification when taken in connection with the accompanying drawings, in which.

Figure 1:
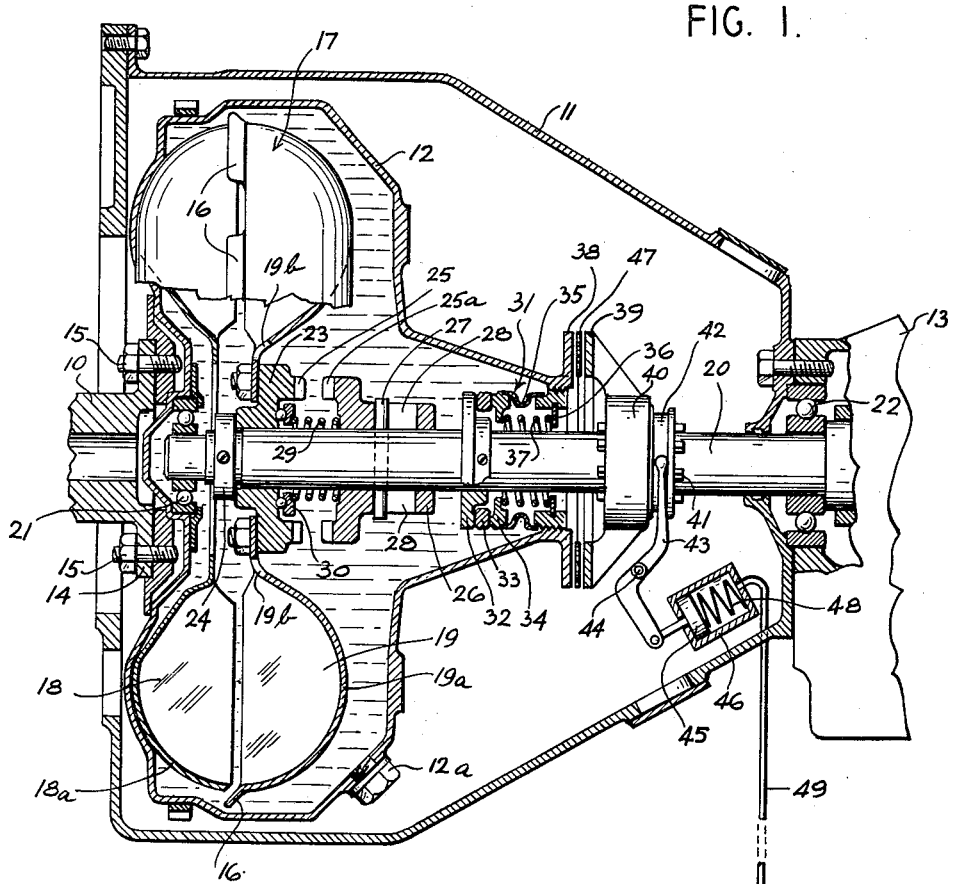
Fig. 1 is a side elevation of the transmission system of the invention with portions thereof shown in vertical section, and the brake control system shown schematically.
Figure 1:
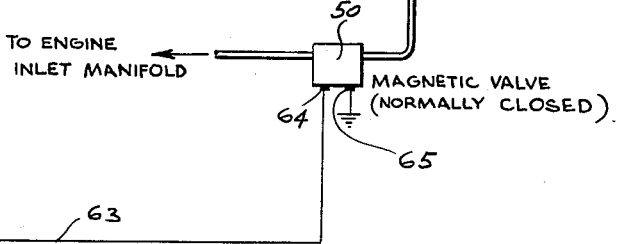

My invention is shown in the drawings as applied to a motor vehicle having a fluid drive, parts of which are of a conventional and well-known type.

Referring to Fig. 1, the crankshaft 10 of the vehicle engine extends into the clutch housing 11 which is rigidly mounted rearwardly of said engine. The drive of the crankshaft 10 is transmitted through a fluid coupling 17 which is housed in a fluid casing 12, to the usual gear train housed within a gear box 13 located rearwardly of clutch housing 11, and thence to the wheels of the vehicle in the usual manner. The gear train within the gear box 13 may be of any well-known automatic or semi-automatic shift type.

The free end of the engine crankshaft 10 has a terminal flange 14 which is rigidly fixed to the fluid casing 12 by nut and bolt assemblies 15, so that fluid casing 12 rotates with crankshaft 10. The fluid casing 12 contains the usual fluid which operates the fluid coupling in a manner which will be presently described. Said fluid casing 12 has the preferred shape shown in the drawings, having a closed forward end and rear open end. Said casing 12 also has the usual filler plug 12a by means of which the contained fluid may be changed or replenished.

The fluid coupling 17 comprises the usual vaned impeller or driving member 18, and the usual corresponding vaned runner or driven member 19. The general internal construction of these members 18 and 19 may be of any suitable type, such as the conventional types now in use. The impeller 18 is fixed to the inner wall surface of fluid casing 12, so that said impeller 18 rotates with fluid casing 12. The runner 19 is mounted on the forward end of a driven shaft 20 which extends through clutch housing 11 and is adapted to transmit its drive to the gears housed within gear box 13. The front end of driven shaft 20 is journalled in fluid casing 12 by a ball-bearing assembly 21. The driven shaft 20 is journalled adjacent its rear end in the front end of gear box 13 by a second ball bearing assembly 22.

The hub 23 of runner 19 is mounted for free rotation around the driven shaft 20. Said driven shaft 20 has a fixed flange or ring 24 located between the impeller 18 and the runner hub 23, said flange 24 limiting the forward movement of runner hub 23 and maintaining the vanes of impeller 18 and runner 19 in spaced relationship to each other, as shown in Fig. 1.

The impeller 18 and runner 19 have separate respective outer casings 18a and 19a of substantially semi-toroidal shape, whose inner open ends face each other, are transversely alined with each other, and are spaced from each other. The casing 19a of runner 19 has a plurality of inclined external fins 16 which are spaced around its open end. Said fins 16 extend forwardly and outwardly, at an angle to the outer wall surface of casing 19a.

The casing 19a of runner 19 also contains a series of holes or openings 19b adjacent the runner hub 23. These holes 19b permit the replenishment of fluid between the impeller 18 and runner 19, as said fluid is driven externally of the casings 18a and 19a by the centrifugal pumping action of the impeller 18, in a manner which will be presently described.

Figure 2:
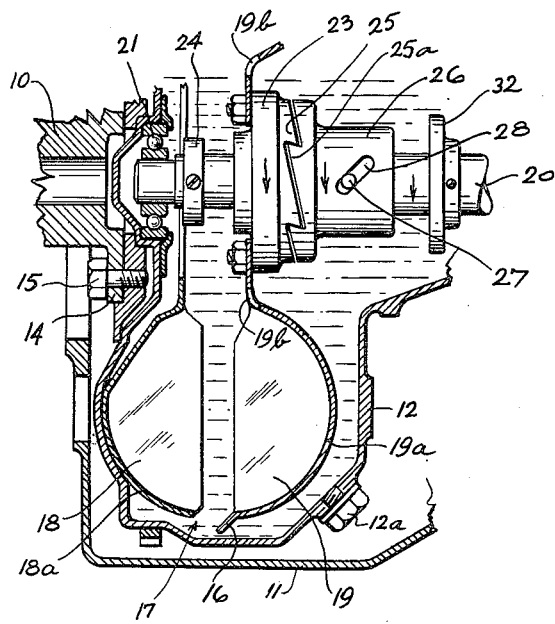
Fig. 2 is a side elevation of the coupling assembly of the transmission system during an intermediate stage of operation, with portions thereof being shown broken away and in section.
Figure 3:
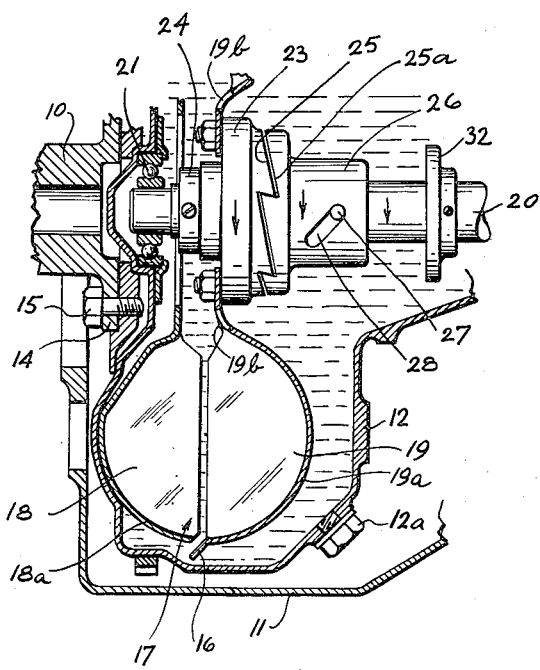
Fig. 3 is a side elevational view of the coupling assembly similar to Fig. 2, but showing the assembly in its coupled position for operation of the fluid coupling.

The rear end of runner hub 23 carries a claw-coupling jaw 25. A matching claw-coupling jaw 25a is carried by a sleeve 26 which is mounted on driven shaft 20 for limited turning and longitudinal sliding movement. A guide pin 27 extends through driven shaft 20 and is rigidly secured thereto. The ends of guide pin 27 extend through respective opposed slots 28 in the sleeve 26. As shown in Figs. 2 and 3, these slots 28 are diagonally disposed relative to the longitudinal axis of driven shaft 20. The ends of guide pin 27 are slidable in said slots, the turnable and longitudinal movement of sleeve 26 relative to driven shaft 20 being limited by the lengths of said slots. While a single guide pin 27 and a pair of slots 28 have been shown and will be described for clarity, it is to be understood that the shaft 20 may be provided with a number of radial guide pins 27, and the sleeve 26 provided with a corresponding number of pairs of slots 28, in order to provide greater structural strength during operation of the fluid drive.

A compression spring 29 is mounted about the driven shaft 20 between the sleeve 26 and the hub 23 of runner 19. A ball thrust-bearing 30 is interposed between the spring 29 and the runner hub 23, so that the runner 19 may rotate independently of said spring 29. The compression spring 29 normally urges the runner hub 23 forwardly and into abutment with the flange 24, so that the claw-coupling jaws 25 and 25a are normally spaced from each other and facing each other, as shown in Fig. 1.

The rear open end of the fluid casing 12 is closed by a fluid seal assembly 31 which extends around driven shaft 20 and is adapted to prevent any of the fluid contained in fluid casing 12 from leaking out along driven shaft 20. The fluid seal assembly 31 comprises seal ring 32 which is rigidly fixed to the driven shaft 20 and tightly encircles said driven shaft 20. A washer 33 is mounted on driven shaft 20 between said seal ring 32 and a second washer 34. A resilient skirt member or bellows 35 connects said washer 34 with an annular internal flange 36 removably secured within the free end of fluid casing 12. A compression spring 37 interposed between the washer 34 and flange 36 biases the washer 33 against seal ring 32 to provide a leak-proof seal. The washer 34, skirt 35, and spring 37 rotate with the fluid casing 12, so that when the fluid casing 12 and the driven shaft 20 are rotating at different speeds or independently of one another, the washer 33 rotates slidably against the inner face of the seal ring 32. Thus the greater part of the frictional wear of the seal assembly 31 is concentrated in the washer 33. For this reason, the washer 33 is unattached to the other parts of the seal assembly, so that it may be removed and replaced when worn out without affecting the outer parts of the seal assembly.

The rear open end of the fluid casing 12 is provided with an outwardly-extending peripheral flange 38 which serves as a clutch plate. A clutch disk 39 is mounted upon driven shaft 20 in concentric alinement with clutch plate 38. A friction disc 47 is also mounted on driven shaft 20 between the faces of clutch plate 38 and clutch disc 39.

This friction disc 47 may be of the usual type, as, for instance, the conventional steel disc covered with cork. The driven shaft 20 is provided with a series of longitudinal splines 41 upon which the hub 40 of clutch disc 39 is drivingly mounted. These splines 41 cause the hub 40 to rotate with clutch disc 39, and at the same time enable the hub 40 to slide longitudinally along driven shaft 20. Hub 40 contains a circumferential groove or slot 42. A bifurcated clutch lever 43 is pivotally mounted within clutch housing 11 beneath the clutch disc hub 40 by a pivot pin 44. The free ends of the arms of clutch lever 43 fit within opposite sides of the circumferential groove 42, so that pivoting movement of said clutch lever 43 moves the clutch disc hub 43 longitudinally along driven shaft 20.

The movement of clutch arm 43 is controlled by a piston 45 which is slidably contained in a vacuum cylinder 46. The rod of piston 45 is pivotally connected to the lower end of clutch arm 43. The vacuum cylinder 46 is rigidly fixed within clutch housing 11 in any suitable manner.

A compression spring 48 biases piston 45 against the forward wall of vacuum cylinder 46 so that the clutch lever 43 is normally held in the position of Fig. 1 in which the clutch plate 38 is maintained out of engagement with clutch disc 39. A vacuum pipe 49 extends through the rear wall of vacuum cylinder 46, said vacuum pipe 49 extending to and communicating with the inlet manifold of the engine in such a manner as to transmit the prevailing engine manifold vacuum or suction to the interior of vacuum cylinder 46.

A magnetic valve 50 is interposed intermediate the ends of vacuum pipe 49, said magnetic valve being normally closed and being opened only when electrical current is supplied thereto. The valve 50 thus normally obstructs the vacuum pipe 49 and prevents the transmission of the manifold suction through vacuum pipe 49. The valve 50 is actuated by a storage battery 51 through a circuit extending through a governor switch 52 and a brake switch 53. One terminal 54 of battery 51 is grounded, the other terminal 55 being connected by lead 56 to a terminal 57 of the governor switch 52. The other terminal 58 of said governor switch 52 is connected by lead wire 59 to a contact 60 of brake switch 53. This brake switch contact 60 is fixed to the chassis of the vehicle and is electrically insulated from said chassis. The other contact 61 of brake switch 53 is fixed to the usual foot-brake pedal 62 of the vehicle and is movable therewith, so that when said brake pedal 62 is slightly depressed, the contact 61 is brought into electrical engagement with the contact 60. Brake switch contact 61 is connected by lead wire 63 to one terminal 64 of magnetic valve 50.

The other terminal 65 of magnetic valve 50 is grounded to complete the circuit.

The contacts 60 and 61 of brake switch 53 are spaced a short distance from each other so that only a very slight depression of the brake pedal 62 is necessary to bring said contacts into engagement. This slight depression of brake pedal 62 is not enough to engage the vehicle brakes. The brake pedal 62, may however, be depressed further, if desired, to a position in which the brakes engage, the contacts 60 and 61 remaining in engagement with each other during this increased depression of brake pedal 62, so that the braking action of the vehicle engine supplements the action of the brakes. For this purpose, the contact 60 is connected to the vehicle chassis by a spring 67 or other flexible means.

The governor switch 52 is of the well-known type in which the switch closes when the governor reaches a pre-selected speed of rotation. Said governor switch 52 is mounted on the gear box 13 of the vehicle and is operatively connected to one of the gears of the gear train in such a manner as to enable the rotational speed of the governor to be directly proportional to the speed of the vehicle. The governor switch 52 is pre-set to close when the vehicle reaches a selected speed which is preferably approximately ten miles per hour. When the governor switch is closed, and the brake pedal 62 is depressed to a point at which the brake switch 53 is closed, current flows from the battery 51 through lead wires 56, 59, and 63 to magnetic valve 50, opening said magnetic valve. The suction produced at the engine inlet manifold is then transmitted through vacuum pipe 49 to the interior of vacuum cylinder 46, creating a substantial vacuum within cylinder 46, and causing the piston 45 to be drawn inwardly against the tension of spring 48. This movement of piston 45 toward the rear of vacuum cylinder 46 pivots the upper end of brake lever 43 forwardly, causing the clutch disc hub 40 to slide forwardly on splines 41 until the clutch disc 39 presses the friction disc 47 firmly against clutch plate 38. Clutch plate 38 is thus frictionally coupled to clutch plate 39 through friction disc 47, so that the fluid casing and driven shaft 20 are directly and rigidly coupled, and rotate in unison.

When the vehicle engine is actuated, preparatory to starting the vehicle, the engine crankshaft 10, the fluid casing, and the impeller or driving member 18 rotate slowly in unison. The fluid within fluid casing 12 circulates slowly in the usual manner of fluid drives and its driving action upon the vanes of the runner or driven member 19 cause said runner 19 to rotate slowly. The parts of the fluid drive are in the position shown in Fig. 1. The runner 19 is closely spaced from impeller 18 by the biasing tension of spring 29 which also holds the jaws 25 and 25a of the claw coupling spaced apart from each other. The sleeve 26 is also held by spring 29 in a position in which the ends of guide pin 27 are located at the forward ends of the diagonal slots 28. In this position of the runner 19, the runner hub 23 is mounted for free rotation upon driven shaft 20, so that it merely idles and does not turn the driven shaft 20, which remains stationary.

While the engine is idling, the clutch disc 39 is disengaged from clutch plate 38, even if the brake pedal 62 is depressed, since the vehicle has not attained a speed of ten miles per hour, and the governor switch 52 is therefore open.

To start the vehicle moving, the accelerator is depressed in the usual manner, causing the engine crankshaft 10, the fluid casing 12, and the impeller 18 to rotate more rapidly. The increased rotational speed of the impeller 18 has a centrifugal pumping effect which causes the fluid within the impeller 18 to flow radially outward and to strike the inclined fins 16 of the runner 19, pushing the runner 19 rearwardly along driven shaft 20, against the tension of spring 29, until its claw-coupling jaw 24 locks with claw-coupling jaw 25 of sleeve 26, as shown in Fig. 2. This rearward movement of runner 19 is also aided by the thrust of the fluid which is driven rearwardly from the vanes of impeller 18 directly against the vanes of runner 19.

As the runner 19 arrives at its position of Fig. 2, in which the claw-coupling jaws 25 and 25a interlock, the inner open end of runner 19 is spaced relatively far from the inner open end of impeller 18. At this position, there is appreciable slippage between the impeller 18 and runner 19, so that while the runner 19 continues to be rotated by the fluid circulation, the fluid does not apply much torque force to the runner 19. Hence when the runner 19 is rotatably coupled to the driven shaft 20, the coupling is a smooth and continuous movement, without an appreciable shock or jolt. The vehicle may thus be started and brought to cruising speed without the use of an intermediate or second gear.

As shown by the directional arrows in Figs. 2 and 3, the runner 19 is driven in a clockwise direction as viewed from the front of clutch housing 11. When the claw-coupling jaw 25 of runner hub 23 locks with the claw-coupling jaw 25a of sleeve 26, said sleeve 26 is also turned in a clockwise direction until the ends of guide pin 27 engage the rear ends of slots 28, as shown in Fig. 3. Since the slots 28 are diagonally disposed, movement of said slots 28 relative to the guide pin 27 moves sleeve 26 forwardly, and the runner 19 is returned to its original position in which it is closely spaced from impeller 18, and can receive the full driving force of impeller 18. The runner 19 is now, however, drivingly coupled to the driven shaft 20 so that the shaft 20 is rotated by said runner 19. Since the runner 19 is driving the driven shaft 20, the clockwise rotation of said runner maintains the pin 27 at the rear ends of slots 28, so that the claw-coupling jaws remain in locked engagement against the tension of compression spring 29. The claws of jaw 25 are tapered in a downward direction to insure this locked engagement.

If the gears are set at a forward drive, the vehicle moves forwardly, the fluid coupling driving the driven shaft 20 in the usual manner, and the shaft 20 transmitting its drive through the gear train to the wheels of the vehicle. This fluid transmission is maintained as long as steady or increasing pressure is maintained on the accelerator.

When it is desired to slow down or stop the vehicle, pressure on the accelerator is released and the engine begins to decelerate, decreasing the rotational speed of impeller 18. Due to the momentum of the vehicle, however, the driven shaft 20 and runner 19 tend to continue their rapid rotation. The rotation of runner 19, however, is soon dampened by the action of the fluid, with the result that the driven shaft 20 rotates faster than the runner 19. This difference in rotational speed causes the guide pin 27 to move to the forward end of diagonal slots 28, which in turn, causes the sleeve 26 to slide rearwardly along driven shaft 20, thus bringing the claw-coupling jaws 25 and 25a out of engagement with each other. The jaws 25 and 25a are held in this spaced relationship by the compression spring 29. The runner 19 is thus no longer coupled to the driven shaft 20, said driven shaft 20 turning freely and independently of the engine and the vehicle being in free wheeling.

If, at this stage, sufficient pressure is again applied to the accelerator, the claw-coupling jaws 25 and 25a again interlock, and the normal fluid drive action is resumed.

If, however, it is desired to halt the vehicle completely, or decrease its speed appreciably, a slight pressure is applied to brake pedal 62, causing the brake switch 53 to close. The governor switch 52 is already closed if the vehicle is travelling over ten miles per hour. The electrical circuit is therefore closed through magnetic valve 65, causing said magnetic valve 65 to open, and enabling the suction of the engine inlet manifold to be transmitted through vacuum pipe 49 to vacuum cylinder 46. This suction causes the piston 45 to be drawn inwardly within vacuum cylinder 46, against the tension of spring 48, causing clutch lever 43 to pivot until clutch disc 39 frictionally couples with clutch plate 38. The driven shaft 20 is now rigidly coupled to the engine crankshaft 10 by fluid casing 12, so that the fluid drive assembly 17 is completely by-passed. In this stage, the drag of the unaccelerated engine is utilized to brake the vehicle, providing greater braking power than is achieved in the conventional fluid drive assemblies.

This utilization of engine drag for braking eliminates one of the chief problems found in most fluid transmissions. In conventional fluid drives, the engine drag is not transmitted through the fluid coupling, with the result that on long down-grades it is necessary to apply steady brake pedal pressure, causing the brakes to become hot and increasing wear thereon. According to the present invention, it is only necessary to remove the foot from the accelerator on long down-grades and depress the brake pedal 62 only until the brake switch 53 is closed, and not enough to cause the brakes to engage.

When the speed of the vehicle decreases to ten miles per hour, or other selected minimum speed, the preset governor switch 52 opens automatically, closing the magnetic valve 50, and enabling the spring 48 to push the piston 45 to its original forward position of Fig. 1. The piston 45 thereupon pivots the brake lever 43 to its normal position in which clutch disc 39 is brought out of contact with clutch plate 38. The direct coupling of the engine crankshaft 10 with the driven shaft 20 is thus disengaged before the engine reaches stalling speed. Although the vehicle is again in free wheeling, this condition is not harmful because the vehicle is travelling at a very low speed and can be easily controlled. At such a low speed, the braking action of the engine is not needed to assist in stopping the vehicle, since the foot-brake may be used alone.

In the event of some defect in the vehicle, or of failure of the battery to start the engine, it often becomes necessary to push or tow the vehicle in order to start the engine. For this purpose, a manual control may be connected to the clutch lever 43 in such a manner that operation of the manual control will pivot the clutch lever. The driven shaft 20 may thus be coupled to the engine crankshaft 10 by manual operation of the control, and the vehicle may be pushed or towed in the usual manner of vehicles with friction-clutch transmissions. This direct coupling feature thus eliminates the difficulty of starting conventional fluid drive vehicles by pushing at high speeds.

While driving, in order to permit shifting of gears, it is only necessary to remove the foot from the accelerator, whereupon the driven shaft 20 is uncoupled from the runner 19, and the gears may shift easily and smoothly without clashing.

In summary, the runner 19 automatically couples with the driven shaft 20, when the runner overrides the driven shaft. Said runner 19 automatically uncouples from the driven shaft 20, when the driven shaft overrides said runner.

While a preferred embodiment of the invention has been shown and described herein, it is obvious that numerous additions, changes, and omissions may be made in the invention without departing from the spirit and scope thereof. For instance, in order to increase structural strength, it may be desirable to mount the sleeve 26 upon diagonal splines which are integral with the driven shaft 20, instead of employing the arrangement of pins 27 and diagonal slots 28. These splines may be arranged to perform the same function as the pin and slot arrangement.

I claim:

1. In a motor vehicle which has an engine, a driving shaft connected to said engine, and a driven shaft, a transmission system comprising a fluid coupling adapted to connect said shafts, said fluid coupling including a rotatable impeller and a runner contained in a fluid casing, said impeller being rotatably coupled to said driving shaft, said runner being mounted on said driven shaft, biasing means normally urging said runner to a forward position in which it is free to rotate upon said driven shaft and in which said runner is closely spaced from said impeller, said runner having fins positioned to receive the centrifugal thrust of the driving fluid and move said runner to a rearward position in which it is further spaced from said impeller, said runner and said driven shaft having coupling means which engage when said runner is brought to said rearward position, and cam means operable by said coupling means to move the coupled runner back to its forward position when said runner overrides said driven shaft and to disengage said runner from said driven shaft when the driven shaft overrides said runner.

2. A transmission system according to claim 1 in which said biasing means is sufficiently strong to prevent the centrifugal thrust of the driving fluid from moving said runner to its rearward position at idling speed of the vehicle engine.

3. A transmission system according to claim 1 in which the impeller and the runner have outer shells which have respective open ends which face each other and are alined with each other, the fins of said runner extending radially outwardly at an angle from the periphery of the open end of said runner shell.

4. In a motor vehicle which has an engine, a driving shaft connected to said engine, and a driven shaft, a transmission system comprising a fluid coupling including a rotatable impeller and a runner contained in a fluid casing, said impeller being rotatably coupled to said driving shaft, said runner having a hub mounted for free rotation on said driven shaft, said runner being normally biased to a forward position in which it is free to rotate upon said driven shaft and in which said runner is closely spaced from said impeller, said runner being adapted to be moved rearwardly along said driven shaft by the centrifugal thrust of the fluid within said fluid casing, to a rearward position in which it is further spaced from said impeller, said driven shaft having coupling means, said runner hub having matching coupling means positioned to engage with the driven shaft coupling means when said runner is brought to its rearward position, whereby said runner is drivingly coupled to said driven shaft, said driven shaft and said driven shaft coupling means having cooperating cam means arranged to return the coupled runner to its forward position when said runner overrides said driven shaft, said cam means also being adapted to disconnect said runner from said driven shaft when said driven shaft overrides said runner.

5. In a motor vehicle having an engine, a brake pedal, a driving shaft, and a driven shaft, a transmission system comprising a fluid coupling adapted to connect said shafts, said fluid coupling including a driving element and a driven element housed in a fluid casing, said driving element and said fluid casing being coupled to said driving shaft, said driven element being mounted for free rotational movement upon said driven shaft, and being adapted to couple with said driven shaft when the driving shaft is rotated at a selected speed above idling speed, said fluid casing having a planar end surface, said transmission system also having means to rigidly connect said driving shaft to said driven shaft, said means comprising a clutch member mounted on said driven shaft externally of said fluid casing and adapted to be brought into rigid coupling engagement with the planar end surface of said fluid casing, a lever controlling the movement of said clutch member, and actuating means controlled by the vehicle brake pedal and operable by manifold pressure of the engine to actuate said lever when the brake pedal is depressed, and the vehicle is moving at greater than a pre-selected low speed, whereby the driven shaft is rigidly coupled to the driving shaft through the fluid casing.

6. A transmission system according to claim 5 in which the actuating means controlled by the brake pedal comprises an electrical circuit having an intermediate brake switch which is closed by depression of the brake pedal, and a governor switch which is responsive to the speed of the vehicle and which closes when the vehicle travels at a speed above its pre-selected low speed, piston means connected to said lever, a conduit connecting said piston means to the inlet manifold of said engine, and an electrically-operable valve in said circuit in series with said brake switch and governor switch, said valve controlling the manifold pressure in said conduit.

7. In a motor vehicle having a driving shaft and a driven shaft, a transmission system comprising a fluid coupling adapted to connect said shafts, said fluid coupling including a rotatable driving element, a driven element, and a fluid between said elements, said driving element being coupled to said driving shaft, said driven element being mounted for normal free rotation about said driven shaft and being slidable axially on said driven shaft toward and away from said driving element, biasing means normally urging said driven element to a forward position in close proximity to said driving element, said driven element being adapted to be moved to a rearward position away from said driving element against the force of said biasing means by the centrifugal force of said fluid when said driving shaft is rotated at a selected speed above idling speed, said driven element carrying coupling means for connecting said driven element with driven shaft and operatively engageable when the driven element is moved to said rearward position, and cam means arranged to return said driven element to its forward position when said driven element overrides the driven shaft and said coupling means is engaged.

8. In a vehicle which has an engine, a driving shaft connected to said engine, and a driven shaft; a transmission system comprising a fluid coupling including a rotatable impeller and a runner contained in a fluid casing, said impeller being rotatably coupled to said driving shaft, said runner having a hub mounted for free rotation on said driven shaft, said runner being normally biased to a forward position in which it is free to rotate upon said driven shaft and in which said runner is closely spaced from said impeller, said runner being adapted to be moved rearwardly along said driven shaft by the centrifugal thrust of said fluid within said fluid casing to a rearward position in which it is further spaced from said impeller, said driven shaft mounting an axially-slidable coupling sleeve having a clutch face, said runner hub having a matching clutch face positioned to engage with the clutch face of said coupling sleeve when said runner is brought to its rearward position, whereby said runner is drivingly coupled to said driven shaft, and cam means on said sleeve and driven shaft arranged to move said sleeve forwardly for returning the coupled runner to its forward position when said runner overrides said driven shaft, and to move said sleeve rearwardly away from said runner and thereby disconnect said clutch faces when said driven shaft overrides said runner.

9. In a motor vehicle which has an engine, a driving shaft connected to said engine, and a driven shaft, a transmission system comprising a fluid coupling including a rotatable impeller and a runner contained in a fluid casing, said impeller being rotatably coupled to said driving shaft, said runner having a hub mounted for free rotation on said driven shaft, said runner being normally biased to a forward position in which it is free to rotate upon said driven shaft and in which said runner is closely spaced from said impeller, said runner being adapted to be moved rearwardly along said driven shaft by the centrifugal thrust of said fluid within said fluid casing to a rearward position in which it is further spaced from said impeller, said driven shaft carrying an axially-slidable coupling sleeve having a clutch face, said runner hub having a matching clutch face positioned to engage with the clutch face of said sleeve when the runner is brought to its rearward position, said coupling sleeve also carrying cam means, said driven shaft having a cam pin engaging said cam means and operable therewith to move said sleeve forwardly for returning the coupled runner to its forward position when said runner overrides said driven shaft, and to move said sleeve rearwardly away from said runner and thereby disconnect said clutch faces when said driven shaft overrides said runner, said pin also being operative to rotatably couple said driven shaft to said sleeve at the terminal limits of said cam means.

10. In a motor vehicle which has an engine, a driving shaft connected to said engine, and a driven shaft, a transmission system comprising a fluid coupling including a rotatable impeller and a runner contained in a fluid casing, said impeller being rotatably coupled to said driving shaft, said runner having a hub mounted for free rotation on said driven shaft, said runner being normally biased to a forward position in which it is free to rotate upon said driven shaft and in which said runner is closely spaced from said impeller, said runner being adapted to be moved rearwardly along said driven shaft by the centrifugal thrust of the fluid within said fluid casing to a rearward position in which it is further spaced from said impeller, said driven shaft having coupling means comprising a sleeve turnably mounted thereon and having at least one pair of diagonal slots, and at least one pin extending through and rigidly fixed to said driven shaft, the respective ends of said pin extending through said slots, said sleeve also having a clutch face, said runner hub having a matching clutch face positioned to engage with the clutch face of said sleeve when said runner is brought to its rearward position, whereby said runner is drivingly connected to said driven shaft, said driven shaft coupling means being adapted to return the coupled runner to its forward position when said runner overrides said driven shaft, and to disconnect said runner from said driven shaft when said driven shaft overrides said runner.

JACK BOSCH.

References Cited in the file of this patent

UNITED STATES PATENTS

| Number | Name | Date |
|---|---|---|
| 1,953,458 | Bauer et al. | Apr. 3, 1934 |
| 2,019,745 | Swennes | Nov. 5, 1935 |
| 2,170,649 | Banker | Aug. 22, 1939 |
| 2,289,019 | Jessen | July 7, 1942 |
| 2,351,483 | Carnagua | June 13, 1944 |
| 2,402,369 | Carlson et al. | June 18, 1946 |
| 2,409,593 | Sassmanhausen | Oct. 15, 1946 |
| 2,529,400 | Tapsley | Nov. 7, 1950 |